(12) United States Patent  
Cunningham (10) Patent No.: US 8,347,934 B1
(45) Date of Patent: Jan. 8, 2013

(54) LAMINTATED CLAMP FOR A TIRE CHANGER

(75) Inventor: Charles L. Cunningham, Nashville, TN (US)

(73) Assignee: Hennessy Industries, Inc., LaVergne, TN (US)

(*) Notice: Subject to any disclaimer, the term of this patent is extended or adjusted under 35 U.S.C. 154(b) by 194 days.

(21) Appl. No.: 12/260,392

(22) Filed: Oct. 29, 2008

Related U.S. Application Data (60) Provisional application No. 60/983,430, filed on Oct. 29, 2007.

(51) Int. Cl.
*B60B 30/06* (2006.01)
(52) U.S. Cl. ............................. 157/16; 157/17; 157/18
(58) Field of Classification Search .............. 157/14, 157/16, 17–18, 21; 269/286
See application file for complete search history.

(56) References Cited

U.S. PATENT DOCUMENTS

| 5,623,981 | A | 4/1997 | Cunningham et al. |
| 5,941,294 | A | 8/1999 | Cunningham et al. |
| 6,039,104 | A * | 3/2000 | Cunningham et al. .......... 157/21 |
| 6,062,289 | A | 5/2000 | Cunningham et al. |
| 6,182,736 | B1 | 2/2001 | Cunningham et al. |
| 6,276,241 | B1 * | 8/2001 | Cornog et al. .................. 81/170 |
| 7,707,916 | B2 * | 5/2010 | Pirseyedi ....................... 81/128 |

* cited by examiner

*Primary Examiner* — Robert Scruggs
(74) *Attorney, Agent, or Firm* — Waddey & Patterson, P.C.; Mark J. Patterson; Matthew C. Cox (57) ABSTRACT

A clamp for securing a wheel with a rim on a rim-holding tire changer. The clamp includes a base portion, a gripping plate secured to the base portion, and a support plate secured to the base portion such that the gripping plate is disposed between the base portion and the support plate. The gripping plate is configured with a first portion for engaging the rim of a wheel and the support plate is configured with a first portion to engage the rim of the wheel.

18 Claims, 11 Drawing Sheets

LAMINTATED CLAMP FOR A TIRE CHANGER

CLAIM OF PRIORITY

This application claims priority to U.S. Provisional Patent Application No. 60/983,430, filed on Oct. 29, 2007, the entire disclosure of which is incorporated by reference herein.

FIELD OF THE INVENTION

The present invention relates generally to tire changers. More particularly, the present invention relates to a laminated clamp for use with a rim-holding style tire changer.

BACKGROUND OF THE INVENTION

Rim-holding style tire changers are known. A typical rim-holding tire changer includes a chassis having a rotatable tabletop and a tower. A combination mount/demount head is supported by the tower. For example, the mount/demount head may be located at the distal end of a pivotable swing arm attached near the top of the tower. In other cases, the tower itself is tiltable toward and away from the tabletop. Various rim-holding style tire changers are manufactured by Hennessy Industries, Inc. and marketed under the trademark COATS®.

During a typical tire mounting procedure, the operator places a rim on the tabletop, secures the rim to the tabletop using radially-movable clamps, places a tire over the rim, mounts the tire by using the mount/demount head to force the bead of the tire over the rim, and then fills the air chamber of the tire with air to inflate the tire. In most cases, the previous tire must first be removed from the rim before installing a new tire. This procedure is described in detail in U.S. Pat. No. 5,623,981, which is incorporated by reference herein in its entirety. It is important that the rim be securely held during this process as it requires a considerable amount of force to mount and demount the tire from the rim. Additionally, it is also important that this be accomplished in a manner that does not damage the rim.

The clamps are typically attached to respective clamp carriers located on the tabletop. The operator controls inward and outward movement of the clamp carriers in a radial direction to secure or release the rim, as desired. The clamps are generally constructed from steel or a similar hard metal and formed so that they can be used in two ways, either by clamping the outer periphery of the rim or by clamping an inside surface of the rim. The clamps often have serrations on their respective outer surfaces for engaging the inside surface of the rim and a cupped surface, or claw, on the inside of the clamp for holding the rim from the outside. With existing rim-holding tire changers, it is not uncommon for there to be some amount of rotational slippage of the rim relative to the clamps during the mount/demount procedure. The rotational slippage is undesirable in that it can lead to possible damage to the rim.

Inside clamping of the tire rim presents various considerations that may be relevant. For example, tire rims often have a "conical" taper on the rear inside surface where the rim is held for tire removal and replacement. In many cases, road grime and oil may have accumulated on this tapered surface. Because the force used to hold the rim in place is based on a frictional connection, the road grime and oil may cause the wheel to move upward and off the clamps. In addition, the increased force required to remove performance type tires from the rim of the wheel can cause the frictional connection to fail. If the rim becomes disengaged from the clamps, significant damage to the decorative surfaces of the rim can result. As expected, the varying amounts of damage that are possible can require that the rim of the wheel has to be repaired or replaced.

To remedy these issues, in some cases, manufacturers have provided a protective covering of plastic material to cover the clamp. Manufacturers have also provided rubber blocks that are compressed between the clamp and the inside surface of the wheel rim. However, the plastic covers and the rubber blocks may not effectively secure the rim unless it is clean and free of road grime and the like. Another option has been to put nylon booties over the clamps to protect the wheel rim, but this method suffers from the same issues noted above.

Additionally, it is known to provide a clamp for use in a rim-holding tire changer wherein resilient gripping plates are disposed between metal support plates such that first portions of the gripping plates engage the rim of the wheel during inside clamping operations and second portions of the gripping plates engage the rim of the wheel during outside clamping operations. For example, such a clamp is described in detail in U.S. Pat. No. 6,062,289, the entire disclosure of which is incorporated by reference herein, and which is assigned to the Assignee of the present invention.

The present invention recognizes and addresses the foregoing considerations, and others, of prior art constructions and methods.

SUMMARY OF THE INVENTION

According to one aspect, the present invention provides a clamp for use in securing a wheel rim on a rim-holding tire changer. The clamp includes a base portion, at least one gripping plate secured to the base portion, at least one support plate secured to the base portion such that the at least one gripping plate is disposed between the base portion and the at least one support plate. The at least one gripping plate is configured to allow a first portion of the at least one gripping plate to operably engage the wheel rim. Preferably, the at least one support plate is configured to allow a first portion of the support plate to operably engage the wheel rim.

Another aspect of the present invention provides a clamp for use in securing a wheel rim on a rim-holding tire changer. The clamp includes a base portion with a body plate extending upwardly therefrom, a first gripping plate secured adjacent a first side of the body plate of the base portion, and a first support plate secured adjacent the first gripping plate such that the first gripping plate is disposed between the body plate and the first support plate. The first gripping plate is comprised of a resilient material and includes a first portion extending outwardly beyond the body plate and the first support plate to operably engage an outside surface of the wheel rim. The first support plate may be comprised of a metal and preferably includes a first portion extending outwardly beyond the body plate and the first gripping plate to operably engage an inside surface of the wheel rim.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
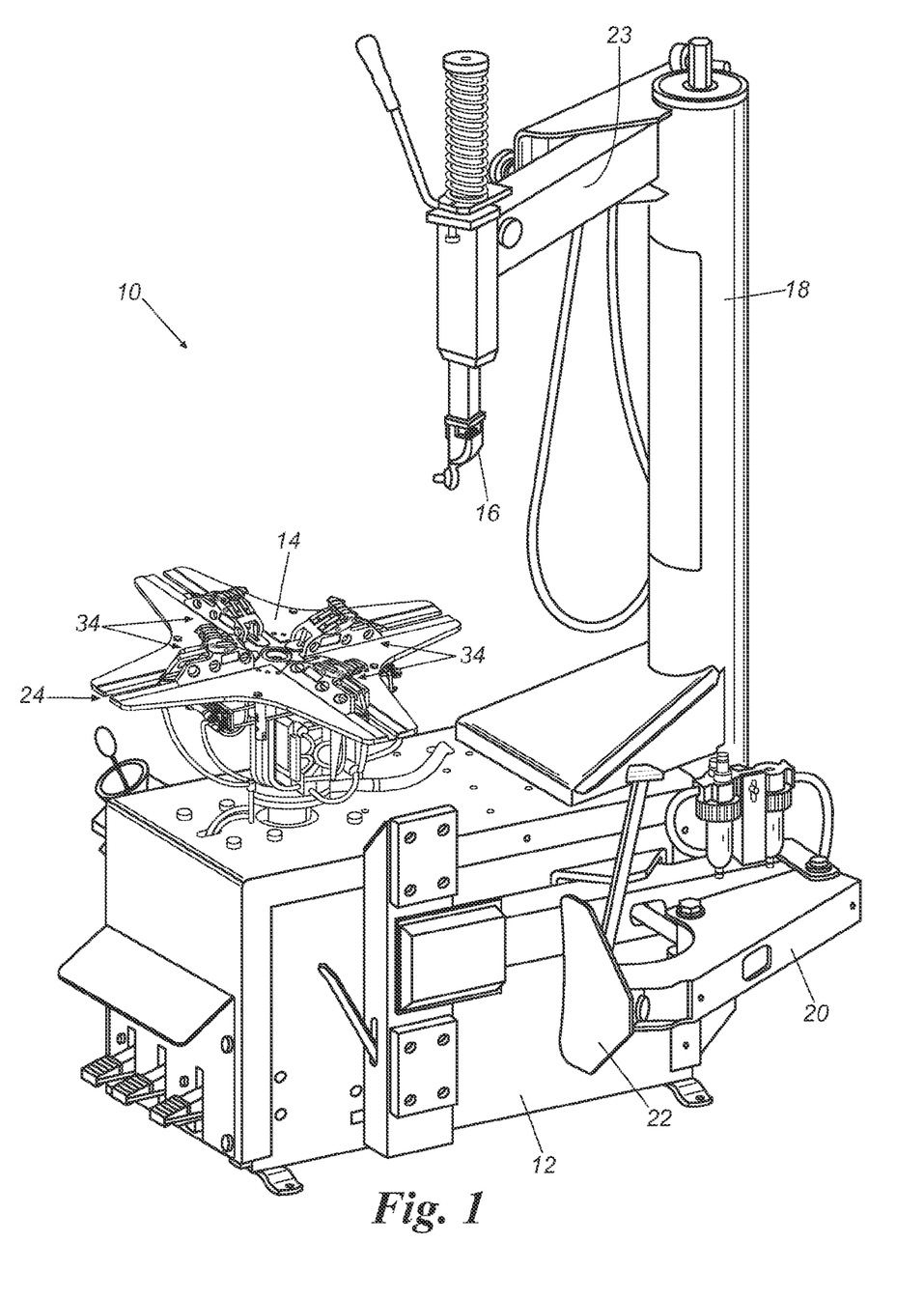
FIG. 1 is a perspective view of a rim-holding style tire changer including a preferred embodiment of a clamp system in accordance with the present invention.
Figure 2:
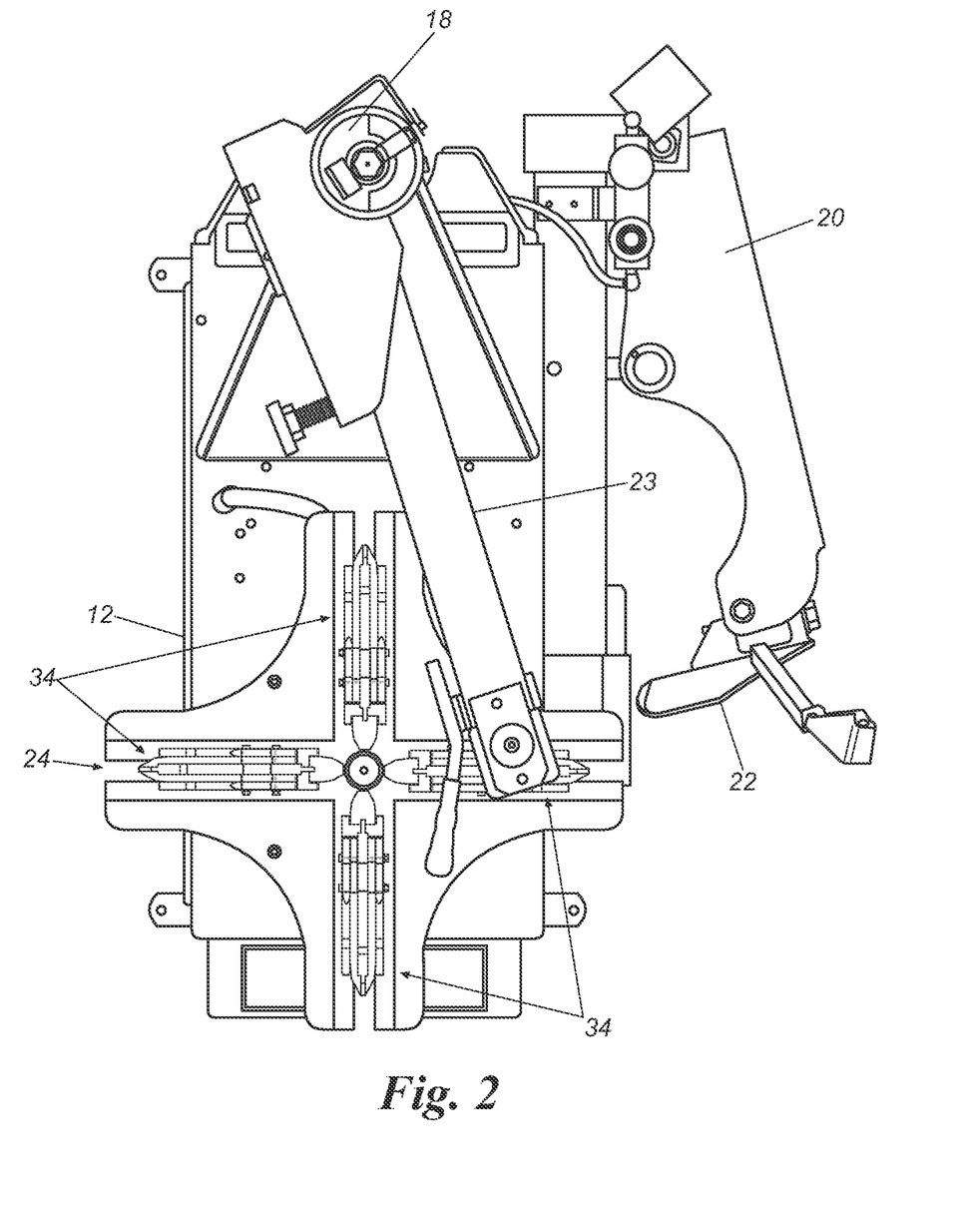
FIG. 2 is a top view of the tire changer as shown in FIG. 1.
Figure 3:
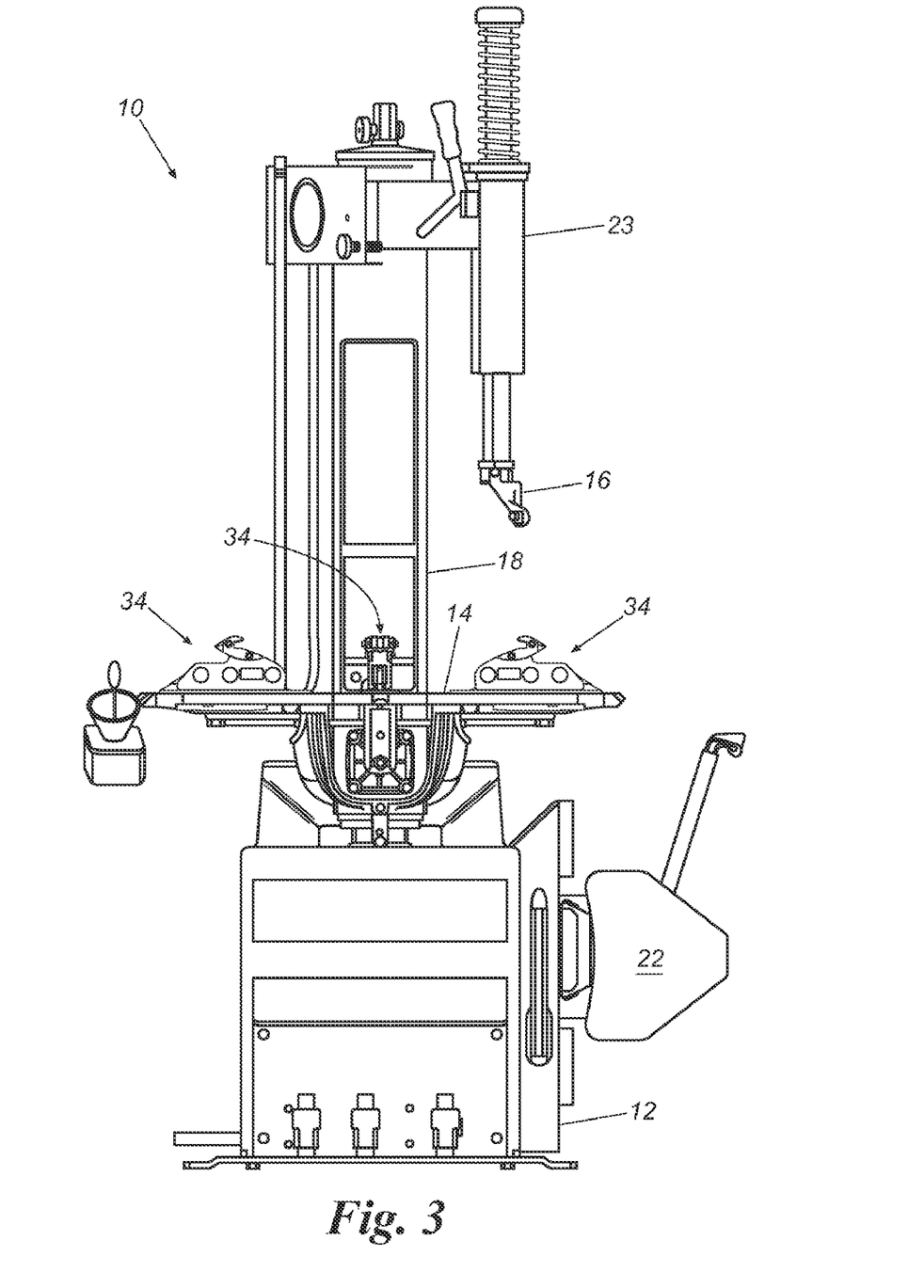
FIG. 3 is a front view of the tire changer as shown in FIG. 1.

Referring to FIGS. 1 through 3, a rim-holding tire changer 10 includes a chassis 12, a rotatable tabletop 14, a mount/demount head 16, a tower 18, and a carrier arm 20 that supports a bead loosener shoe 22. Head 16 is located at the distal end of a swing arm 23 pivotally attached near the top of column 18. As shown, tabletop 14 also includes a plurality of clamp assemblies 34 constructed in accordance with the present invention. As discussed in greater detail below with reference to FIGS. 10A-C and 11A-C, clamp assemblies 34 are used to hold securely a rim 30 of a wheel 26 to assist in mounting and demounting a tire 28 from rim 30.

Figure 4:
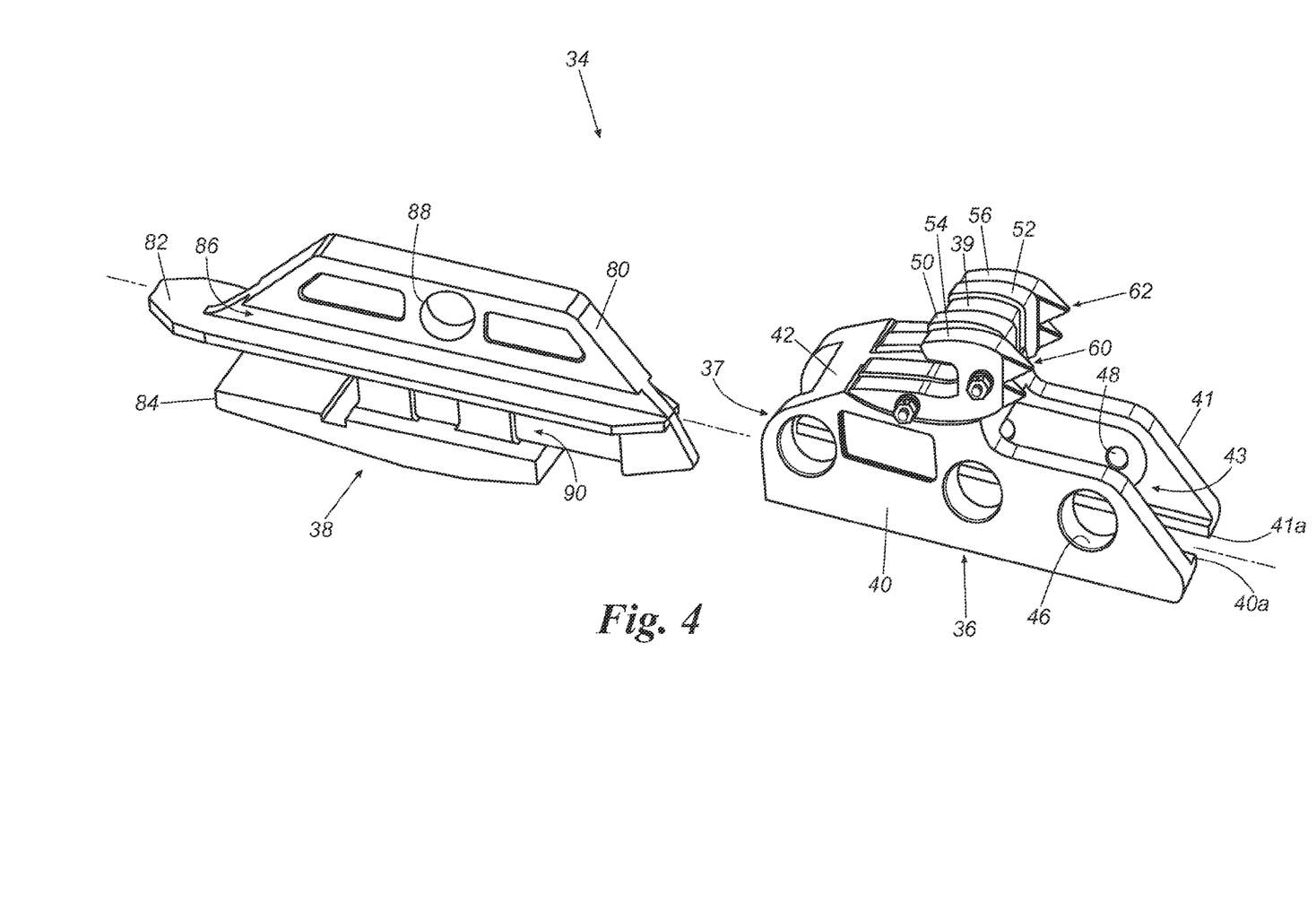
FIG. 4 is a partially exploded perspective view of the clamp assembly from the tire changer as shown in FIG. 1.

Referring now to FIG. 4, clamp assembly 34 includes a clamp 36 that is slidably received on a clamp carrier 38. In the illustrated embodiment, clamp 36 includes a base portion 37 formed by a pair of opposed side walls 40 and 41 that are interconnected by a top portion 42, thereby defining a channel 43. Base portion 37 further includes a rigid body plate 39 extending upwardly in integral fashion from top portion 42. Preferably, body plate 39 is oriented along a longitudinal center axis of clamp 36, as shown. Each side wall 40 and 41 includes an inwardly depending ridge 40a and 41a, respectively, disposed along its bottom edge. As well, each side wall 40 and 41 includes a plurality of opposed pin apertures 46 and 48, respectively, that are configured to assist in fixing clamp 36 to clamp carrier 38, as discussed in greater detail below. As shown, top portion 42, body plate 39 and opposed sidewalls 40 and 41 are unitarily constructed in this embodiment.

Figure 5:
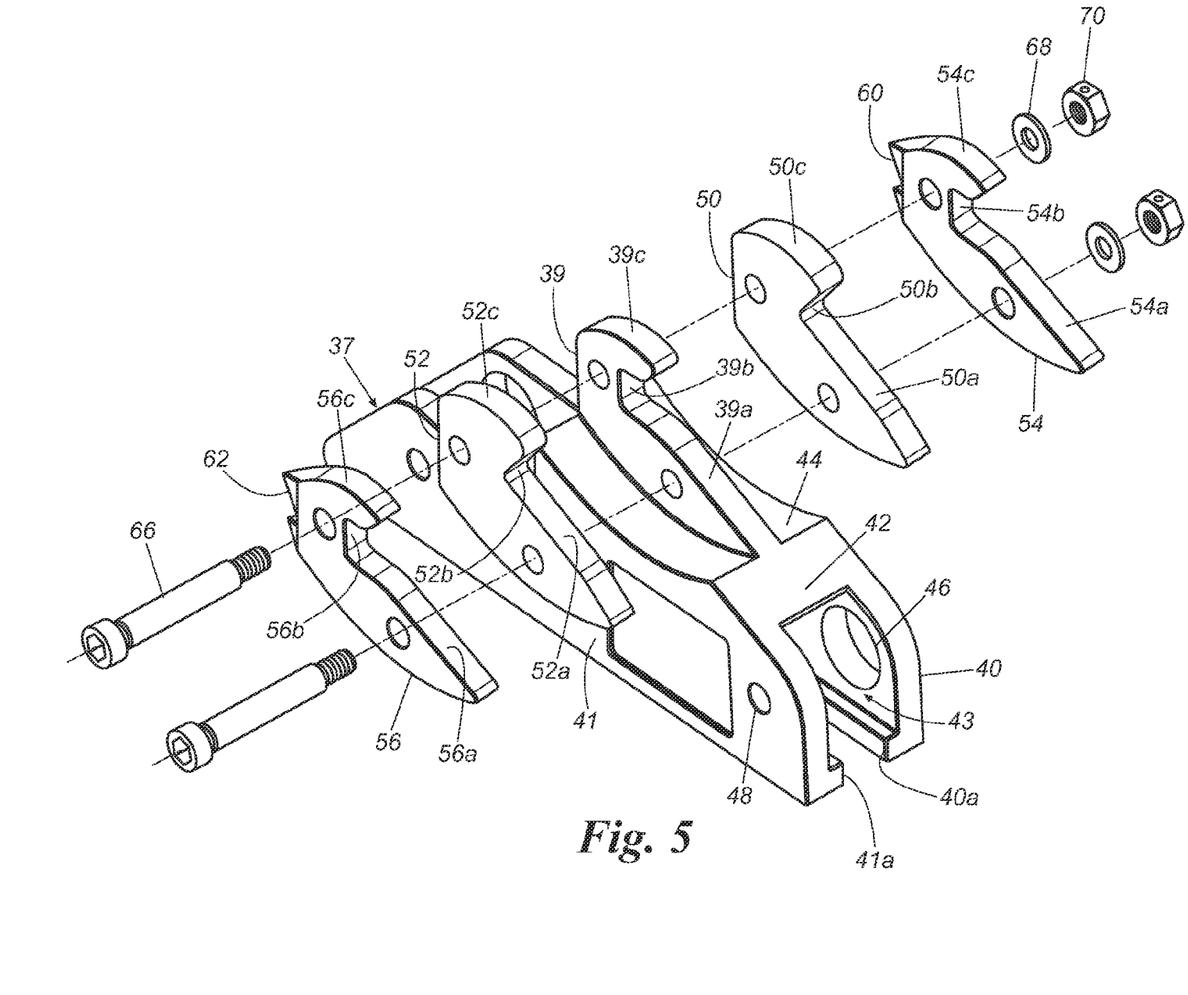
FIG. 5 is an exploded perspective view of the clamp from the clamp assembly as shown in FIG. 4.

As best seen in FIG. 5, body plate 39 includes an inclined surface 39a that extends rearwardly and upwardly from the front of clamp 36 and terminates at an inwardly directed cupped surface 39b. A top surface 39c of body plate 39 is disposed above cupped surface 39b and is smooth and partially rounded to help prevent damage to a wheel during tire mounting operations. A pair of semi-resilient gripping plates 50 and 52 are positioned on opposing sides of body plate 39 and supported thereon by a respective one of rigid side plates 54 and 56. To facilitate the proper positioning of gripping plates 50 and 52 and side plates 54 and 56 with regard to body plate 39, base portion 37 of clamp 36 includes a curved upper surface 44 on each side of body plate 39. Curved upper surfaces 44 are configured to receive the correspondingly shaped bottom surfaces of gripping plates 50 and 52 and side plates 54 and 56.

Figure 6:
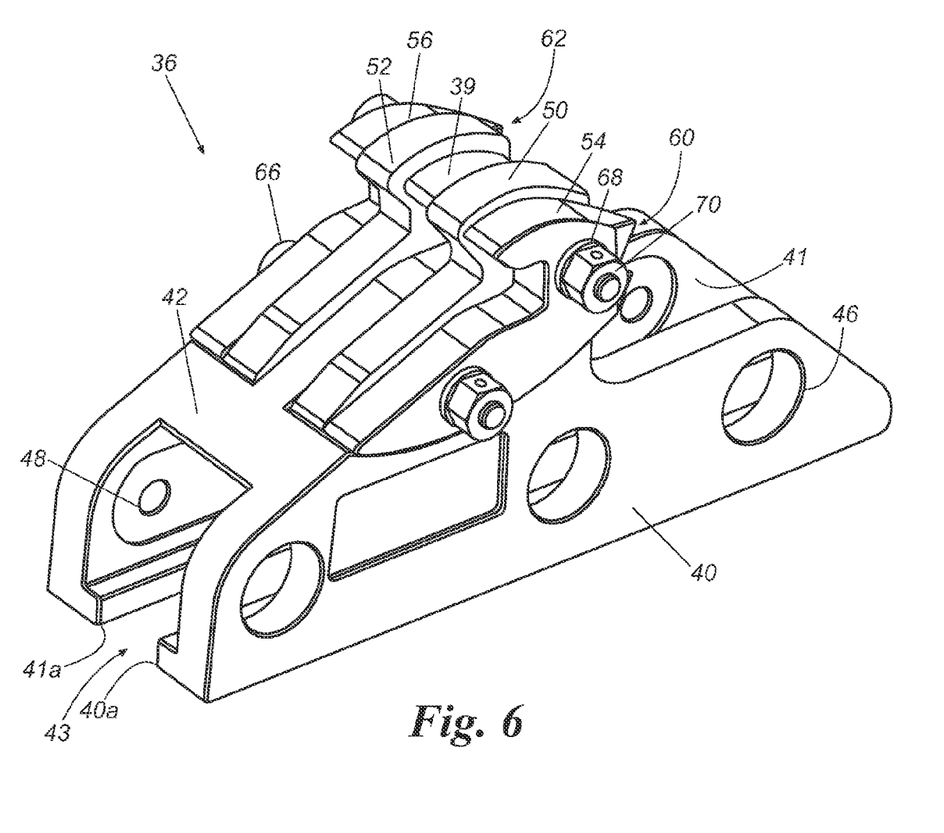
FIG. 6 is an assembled perspective view of the clamp from the clamp assembly as shown in FIG. 4.

Once properly positioned, gripping plates 50 and 52 are supported adjacent body plate 39 by side plates 54 and 56, respectively, by passing suitable fasteners, such as a pair of elongated bolts 66 through correspondingly positioned apertures formed in each of the plates. A threaded end of each bolt 66 receives a corresponding washer 68 and nut 70. Preferably, when assembled, the outer surfaces of side plates 54 and 56 do not extend laterally beyond the outer surfaces of side walls 40 and 41. As shown in FIG. 6, the outer surfaces of side plates 54 and 56 are substantially flush with the outer surfaces of side walls 40 and 41 in this embodiment.

Base portion 37 of clamp 36, as well as side plates 54 and 56, are preferably constructed of a suitable metal, such as steel. However, gripping plates 50 and 52 are preferably formed of a semi-resilient material, such as a high-density nylon or other suitable polymeric or elastomeric material (rubber, urethane, etc.). For example, some embodiments of the present invention may utilize UHMW polyethylene, such as that marketed under the name Quadrant EPP Tivar®.

Each of gripping plates 50 and 52 is sized and configured to include an inclined surface 50a and 52a, a cupped surface 50b and 52b, and a top surface 50c and 52c, respectively, that extends outwardly beyond corresponding inclined surfaces 39a, 54a and 56a, cupped surfaces 39b, 54b and 56b, and top surfaces 39c, 54c and 56c, of body plate 39, side plate 54 and side plate 56, when clamp 36 is fully assembled. As such, when clamp 36 is used to engage a rim 30 of a wheel 26 during outside clamping operations (FIGS. 11A through 11C), cupped surfaces 50b and 52b of gripping plates 50 and 52, respectively, engage flange 31 of rim 30, rather than the hard metal cupped surfaces 39b, 54b and 56b, of body plate 39 and side plates 54 and 56, respectively. In other words, undesired metal-to-metal contact does not occur during clamping. Utilizing the above noted materials, gripping plates 50 and 52 exhibit sufficient rigidity to engage and hold the wheel rim, while also exhibiting adequate resilience to inhibit marring of the rim's finish.

As previously noted, inside clamping of a wheel rim during tire mounting and demounting operations may be preferable for wheels that do not include decorative rims or for those wheels where hubcaps may provide a decorative cover for the rim of the wheel. As such, in the preferred embodiment shown, each of side plates 54 and 56 includes serrations (collectively indicated at 60 and 62), respectively, extending rearwardly from the side plate opposite the corresponding cupped surface 54b and 56b. In this embodiment, serrations 60 and 62 are each formed as a pair of pyramidal structures projecting from the back of a respective side plate, the respective projections in each pair being located one above the other. However, other suitable serration configurations and patterns are contemplated in alternate embodiments. For example, a single pointed projection could be used as well as a plurality of smaller pointed projections. Alternate embodiments of clamp 36 can include serrations formed on body plate 39 opposite cupped surface 39b in addition to or in lieu of those formed on side plates 54 and 56.

Figure 10A:
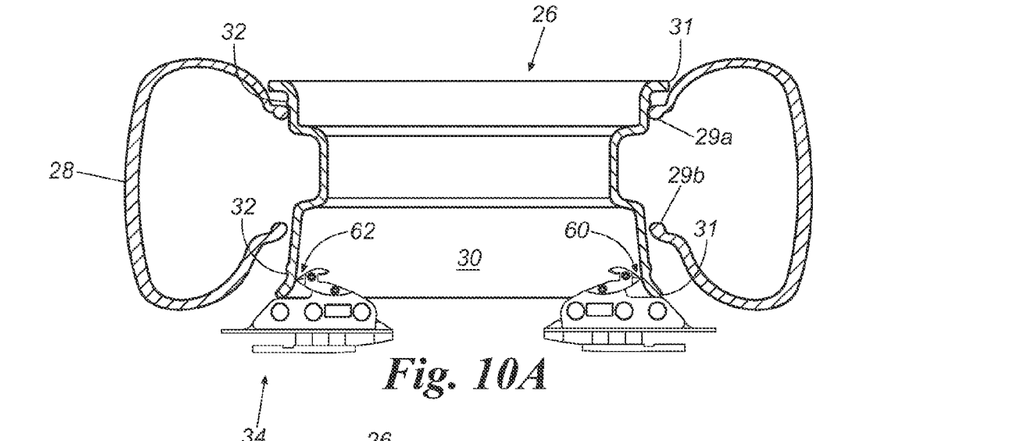
FIGS. 10A through 10C are partial cross-sectional views of clamping assemblies in accordance with the present invention engaging the inner surface of a rim of a wheel during a tire mounting operation.
Figure 10B:
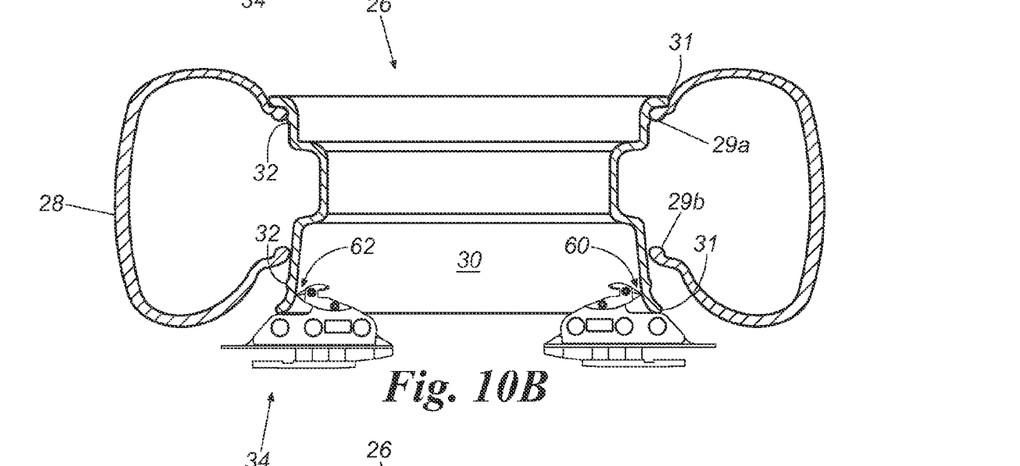
Figure 10C:
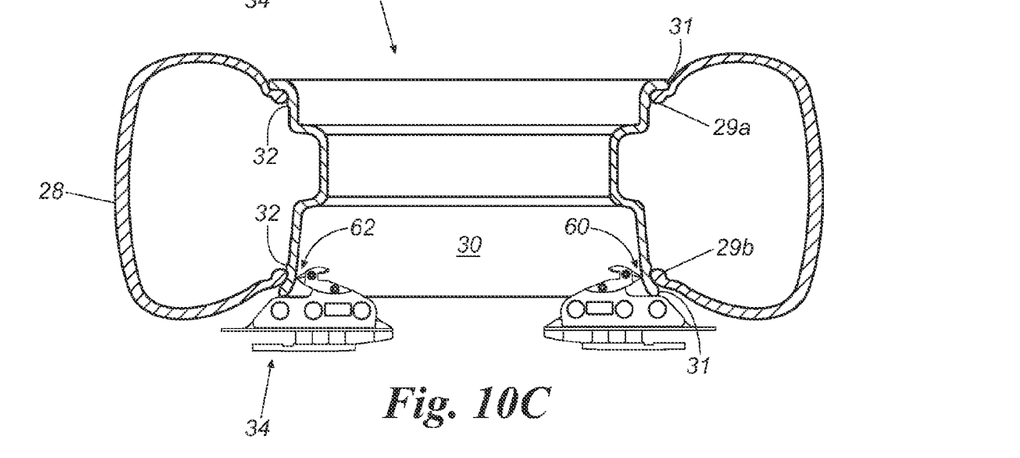

Serrations 60 and 62 are unitarily formed with side plates 54 and 60, respectively, and are therefore similarly formed of a hard metallic material, preferably steel. Thus, serrations 60 and 62 can be used to engage the inside surface of a rim 30 of a wheel 26 during tire mounting and demounting operations (FIGS. 10A through 10C).

As discussed above, side plates 54 and 56 are secured to body plate 39 with suitable fasteners, such as elongated bolts 66 and nuts 70. Accordingly, should serrations 60 and 62 of side plates 50 and 56, respectively, become rounded or misshapen, thereby limiting their effectiveness in engaging the rim, side plates 54 and 56 can be replaced rather than replacing the entire clamp 36. Similarly, should gripping plates 50 and 52 become worn, they can also be replaced without having to replace other components of clamp 36.

As previously noted, it is not uncommon for road grime and the like to build up on the inner surface of a wheel rim. These materials may become impacted on clamping assemblies 34 that are used to engage the rim. In the preferred embodiment shown, because gripping plates 50 and 52 are positioned between side plates 54 and 56, and formed of materials that exhibit at least some resiliency, it is possible to obtain limited movement between side plates 54 and 56 during rim engaging operations. This movement facilitates the release of any impacted materials from serrations 60 and 62 when they are being used to engage rims having excessive material build up on their inner surfaces.

Figure 7:
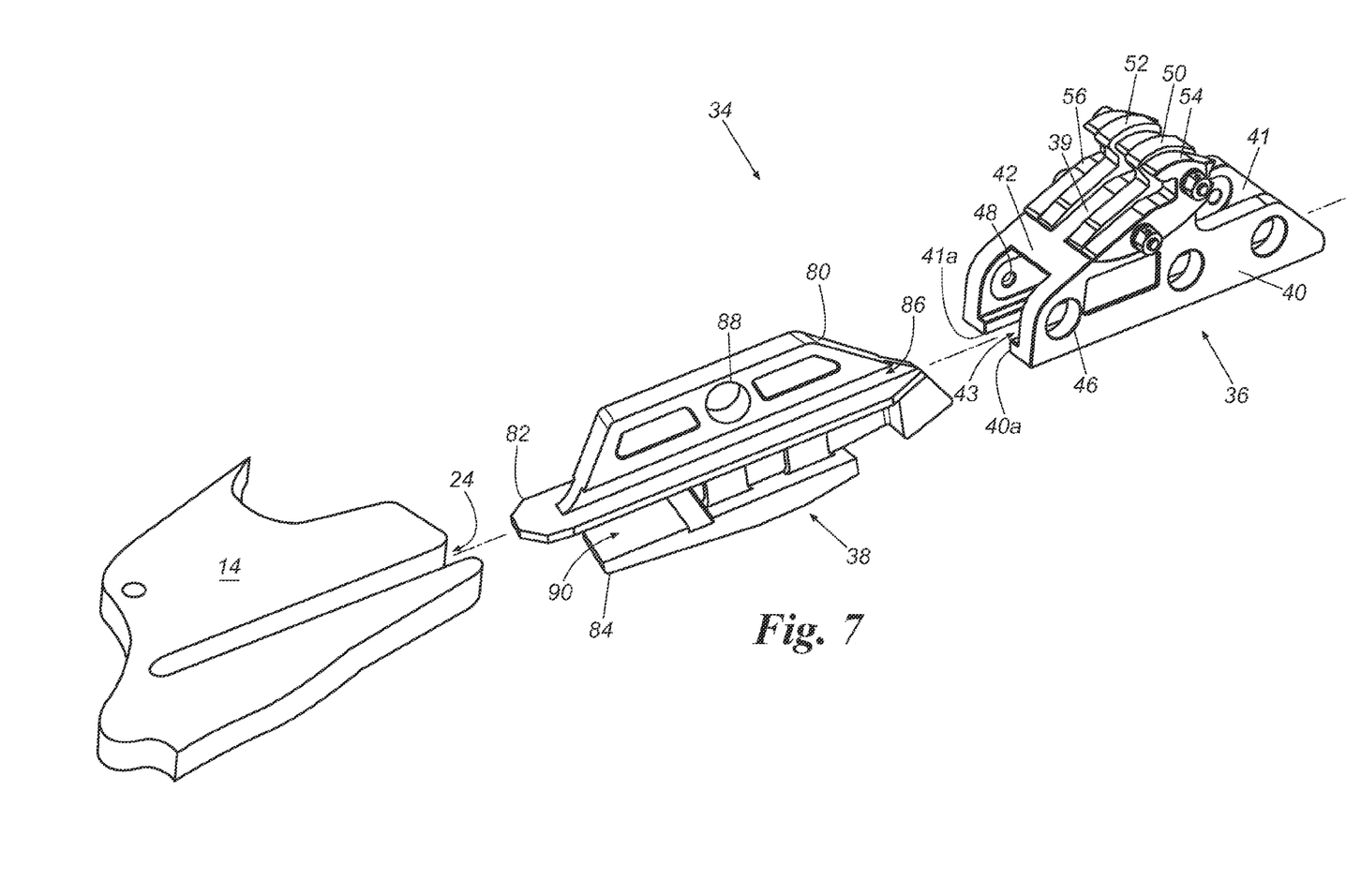
FIG. 7 is a partially exploded perspective view of the clamp assembly as shown in FIG. 4 in association with the tabletop.
Figure 8:
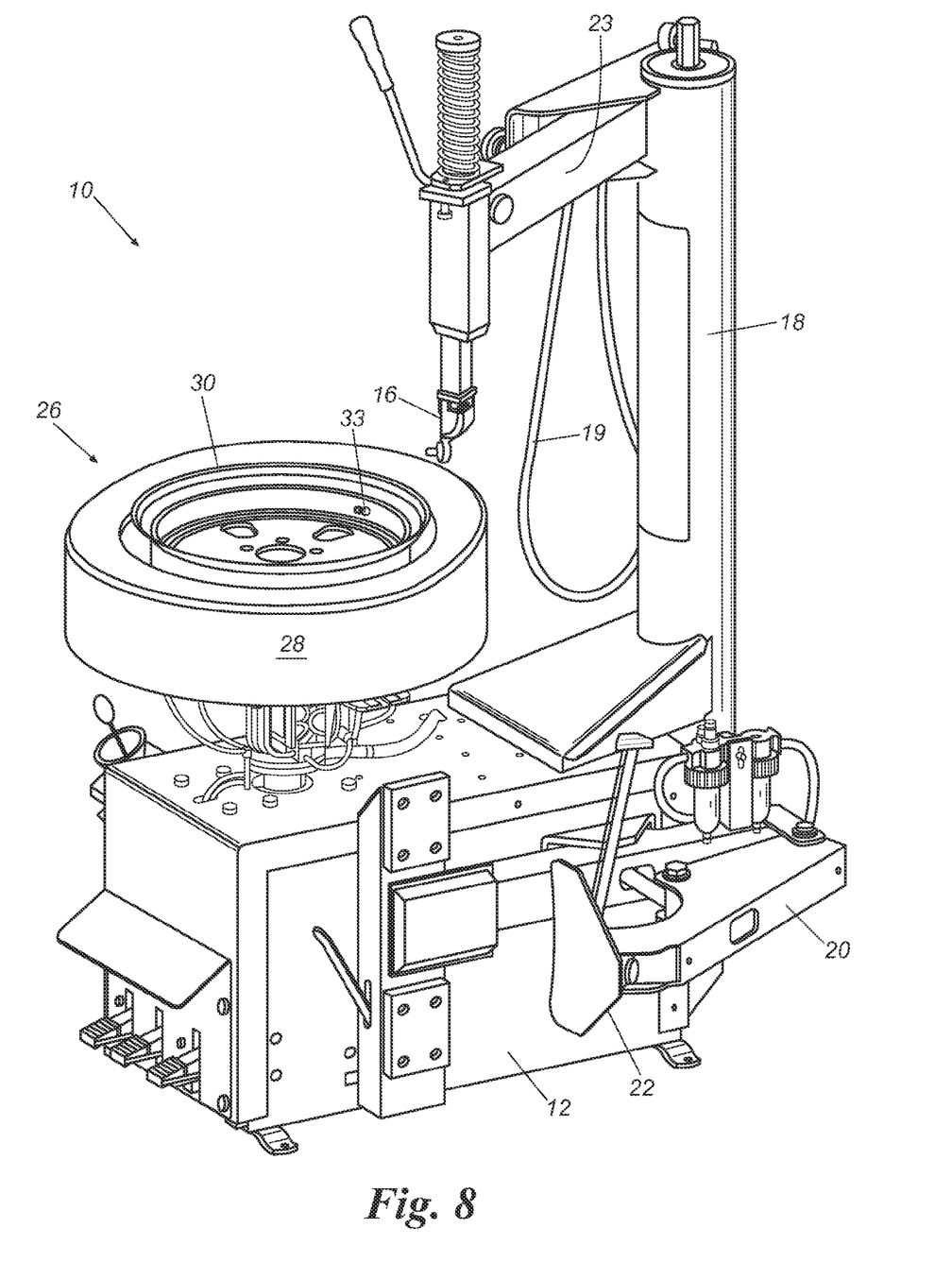
FIGS. 8 through 9 are perspective views of the tire changer shown in FIG. 1 during tire mounting operations.

As shown in FIG. 7, clamp carrier 38 includes a receiver portion 80, a top plate 82 and a bottom plate 84. Receiver portion 80 is disposed above top plate 82 such that a pair of longitudinally extending grooves 86 are formed therebetween. Longitudinal grooves 86 are configured to slidably receive ridges 40a and 41a such that clamp 36 is slidably received on clamp carrier 38. Receiver portion 80 also includes a pin aperture 88 to assist in fixing clamp 36 to clamp carrier 38. Top plate 82 and bottom plate 84 define a gap 90 therebetween such that clamp assembly 34 can be slidably received in a respective slot 24 formed in tabletop 14.

Clamp assembly 34 is assembled by positioning ridges 40a and 41a of clamp 36 in grooves 86 of clamp carrier 38 and sliding clamp 36 on receiver portion 80. When the desired set of apertures formed by one of pin apertures 46 and a corresponding one of pin apertures 48 are aligned with pin aperture 88 of receiver portion 80, a suitable mounting pin is passed through the aligned pin apertures 46, 88 and 48. As a result, clamp 36 will be fixed in position relative to carrier 38. In some embodiments, the pin may be a compressible spring-loaded plunger unit. In the preferred embodiment shown, clamp 36 can be fixed to clamp carrier 38 in any of three positions. As such, clamp assemblies 34 can be used to secure rims of various types and diameters.

Tire mounting operations involving use of the above-disclosed clamp assemblies 34 will now be discussed. Many operations involved in mounting and demounting a tire to a rim are well known in the art. Accordingly, such operations need not be discussed in detail herein. However, tire mounting and demounting operations are discussed in the aforementioned U.S. Pat. No. 5,623,981, as well as U.S. Pat. Nos. 5,941,294 and 6,182,736 to Cunningham, et al., both of which are also incorporated by reference herein in their entireties.

Referring now to FIGS. 8 and 10A through 10C, tire 28 has been mounted on rim 30 and is ready to undergo bead sealing and inflation. However, prior to mounting tire 28 on rim 30, rim 30 is secured to tabletop 14 with clamp assemblies 34. For inside clamping of rim 30, an operator first moves clamp assemblies 34 radially inwardly in slots 24 on table 14 until serrations 60 and 62 are closer together than the rim's inner diameter. Rim 30, which may be carrying a tire to be removed, is then positioned over clamp assemblies 34. Next, the operator moves clamp assemblies 34 radially outwardly until serrations 60 and 62 engage the inner surface of rim 30. At this point, the operator is ready to demount a previous tire and then mount a new tire 28 on rim 30, as is well known in the art.

Prior to inflating the mounted tire 28, tire 28 is bead sealed to rim 30. Various techniques are contemplated for bead sealing. According to one technique, however, an operator lifts upwardly on tire 28 so that top bead 29a is seated against the outer surface of rim 30, as shown in FIG. 10A. (As used herein, the "outer surface" of the rim is the surface inside of the air chamber formed by tire 28.) By lifting upwardly on tire 28, the operator creates a gap between a bottom bead 29b of tire 28 and the outer surface of rim 30 such that an air burst (provided by any of various known methods) can be injected into the tire's interior. Next, the operator creates a short one to two second burst from a high pressure air source such that air is injected into the gap between bottom bead 29b and rim 30. The air burst causes bottom bead 29b to be forced downwardly as air is captured in the volume defined by tire 28 and rim 30 until bottom bead 29b makes contact with and seals against the outer surface of rim 30. Typically, bead sealing results in an internal tire pressure of one-half to two pounds per square inch. FIG. 10B is a cross-sectional view of tire 28 bead sealed to rim 30.

Figure 9:
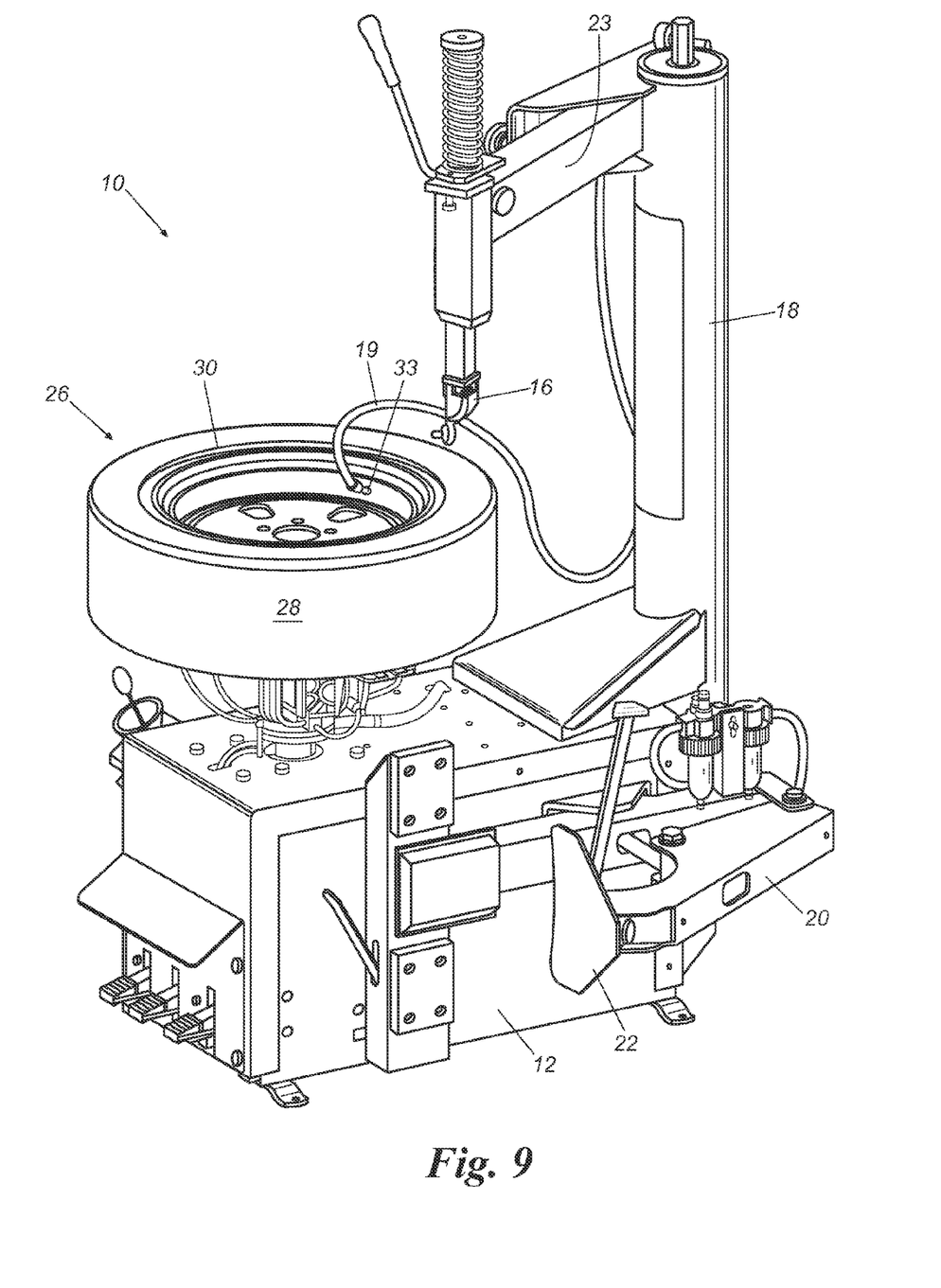

Next, tire 28 is inflated until beads 29a and 29b are properly seated against flanges 31 of rim 30 in their respective bead seats 32, as shown in FIG. 10C. This is accomplished through a valve stem 33, as shown in FIG. 9. Air is injected into tire 28 through valve stem 33 until each bead 29a and 29b is forced over an annular ridge on the outer surface of the rim and into its corresponding beat seat 32. After bead seating, the tire is inflated to the desired pressure and ready for installation on a vehicle. To remove wheel 26 from tire changer 10, the operator retracts clamp assemblies 34 radially inwardly until serrations 60 and 62 of clamp assemblies 34 no longer engage the inner surface of rim 30.

Figure 11A:
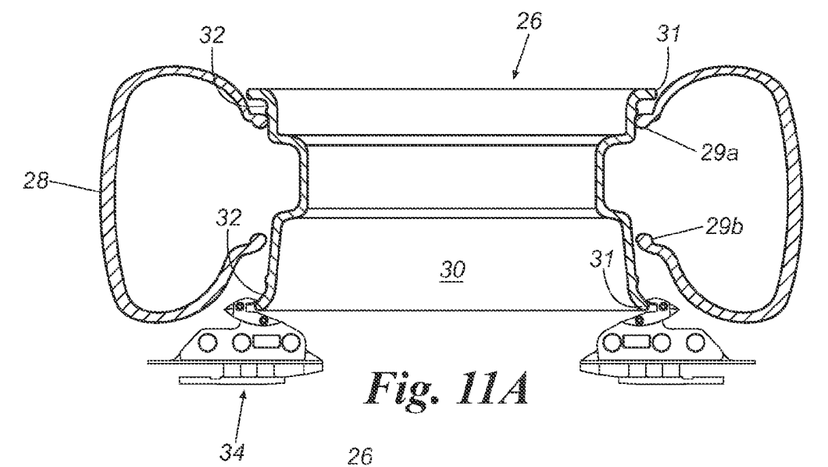
FIGS. 11A through 11C are partial cross-sectional views of clamping assemblies in accordance with the present invention engaging an outer flange of a rim of a wheel during a tire mounting operation.
Figure 11B:
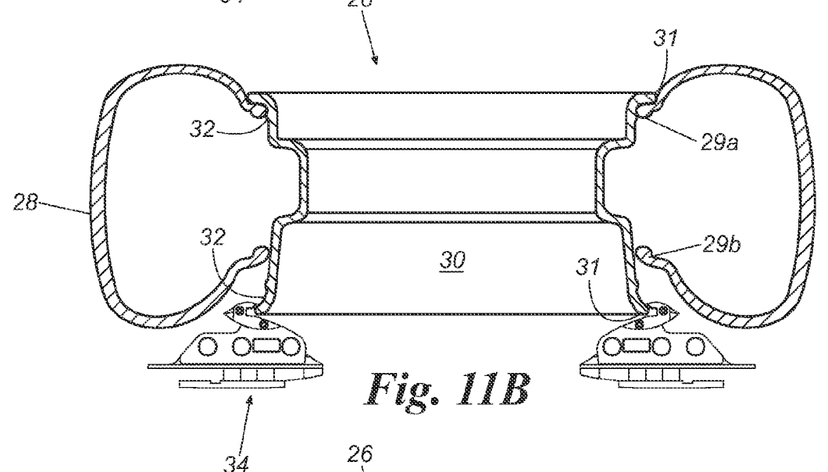
Figure 11C:
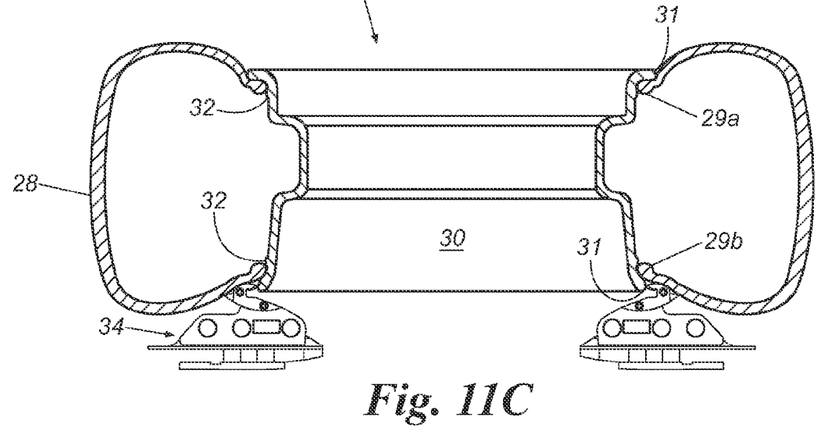

Referring now to FIGS. 11A through 11C, the same operations discussed above can be performed using outside clamping of rim 30 of tire 26, such as for wheels with decorative tire rims. For outside clamping of rim 30, the operator first moves clamp assemblies 34 radially outwardly until flange 31 can be positioned between the cupped surfaces of clamp assemblies 34. Flange 31 of rim 30 is then positioned over clamp assemblies 34. Note, flange 31 can be set on top of inclined surfaces 50a and 52a (FIG. 5) of gripping plates 50 and 52, respectively, prior to moving clamp assemblies 34 radially inwardly to engage flange 31. Because inclined surfaces 50a and 52a extend upwardly beyond the corresponding metal portions of body plate 39 and side plates 54 and 56 (as best seen in FIG. 6), flange 31 will "ride" upwardly along inclined surfaces 50a and 52a until it is engaged by cupped surfaces 50b and 52b. As such, flange 31 of rim 30 will be in contact with the resilient material of gripping plates 50 and 52 rather than the metal portions of clamp 36. Additionally, because top surfaces 50c and 52c of gripping plates 50 and 52 extend upwardly beyond the corresponding metal top surfaces of body plate 39 and side plates 54 and 56, they similarly help prevent inadvertent damage to rim 30.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed:

1. A clamp for use in securing a wheel rim on a rim-holding tire changer, said clamp comprising:
    a base portion including first and second side walls and a top portion, wherein the first and second side walls are interconnected by the top portion;
    a body plate extending upwardly from said top portion at a location between said side walls and in a direction substantially opposite said side walls;
    a pair of gripping plates removably secured to said body plate, a first portion of at least one gripping plate extending outwardly beyond said body plate along a longitudinal center axis of said base portion;
    a pair of support plates removably secured to said body plate, a first portion of at least one support plate extending outwardly beyond said body plate along a longitudinal center axis of said base portion;
    wherein each one of said pair of gripping plates is disposed between said body plate and a corresponding support plate;
    wherein at least one gripping plate is configured to operably engage the wheel rim,
    wherein the body plate, the top portion, and the first and second side walls are unitarily constructed.

2. The clamp of claim 1, wherein at least one gripping plate comprises a semi-resilient material and at least one support plate and said base portion comprise a rigid material.

3. The clamp of claim 2, wherein said semi-resilient material comprises one of a polymeric material, an elastomeric material and a high-density nylon.

4. The clamp of claim 2, wherein said rigid material is a metal.

5. The clamp of claim 2, wherein said first portion of said at least one gripping plate is disposed substantially opposite said first portion of said at least one support plate along a longitudinal center axis of said base portion.

6. The clamp of claim 2, wherein said first portion of said at least one gripping plate further comprises a cupped surface and said first portion of said at least one support plate further comprises at least one pointed projection.

7. The clamp of claim 1, wherein said first portion of said at least one gripping plate is configured to inwardly engage a rim flange and said first portion of said at least one support plate is configured to outwardly engage an inner surface of the rim.

8. A clamp for use in securing a wheel rim on a rim-holding tire changer, said clamp comprising:
    a base portion including a body plate extending upwardly therefrom;
    a first gripping plate secured adjacent a first side of said body plate of said base portion; and
    a first support plate secured adjacent said first gripping plate such that said first gripping plate is disposed between said body plate and said first support plate,
    wherein said first gripping plate is comprised of a semi-resilient material and includes a first portion extending outwardly beyond said body plate and said first support plate to operably engage an outside surface of the rim, and
    wherein said first support plate is comprised of a metal and includes a first portion extending outwardly beyond said body plate and said first gripping plate to operably engage an inside surface of the rim.

9. The clamp of claim 8, wherein said semi-resilient material comprises one of a polymeric material, an elastomeric material and a high-density nylon.

10. The clamp of claim 8, wherein said first portion of said first gripping plate is disposed substantially opposite said first portion of said first support plate along a longitudinal center axis of said base portion.

11. The clamp of claim 8, wherein said first portion of said first gripping plate further comprises a cupped surface and said first portion of said first support plate further comprises at least one pointed projection.

12. The clamp of claim 8, further comprising a second gripping plate secured adjacent a second side of said body plate and a second support plate secured adjacent said second gripping plate.

13. A clamp assembly for use in securing a wheel rim on a rim-holding tire changer, said clamp assembly comprising:
    a clamp carrier;
    a clamp comprising,
    a base portion including first and second opposed side walls, wherein the base portion includes a top portion interconnecting the first and second opposed side walls;
    the base portion including a body plate extending from the top portion at a location between the first and second opposed side walls, the body plate extending in a direction away from the first and second opposed side walls;
    a first gripping plate secured adjacent a first side of said body plate of said base portion; and
    a first support plate secured adjacent said first gripping plate such that said first gripping plate is disposed between said body plate and said first support plate,
    wherein said first gripping plate is comprised of a semi-resilient material and includes a first portion extending outwardly beyond said body plate and said first support plate to operably engage the rim,
    wherein the top portion, the body plate and the first and second opposed side walls comprise a one-piece construction.

14. The clamp of claim 13, wherein said first support plate is comprised of a metal and includes a first portion extending outwardly beyond said body plate and said first gripping plate to operably engage an inside surface of the rim.

15. The clamp of claim 13, wherein said semi-resilient material comprises one of a polymeric material and an elastomeric material.

16. The clamp of claim 13, wherein said semi-resilient material comprises a high-density nylon.

17. The clamp of claim 13, wherein said semi-resilient material is polyethylene.

18. A clamp for use with a clamp carrier in securing a wheel rim having a rim flange on a rim-holding tire changer, said clamp comprising:
    a base portion including a top portion, a body plate extending upwardly therefrom, and a pair of opposed sidewalls extending downwardly therefrom, thereby forming a channel configured to slidably receive a portion of the clamp carrier;

a first gripping plate secured adjacent a first side of said body plate of said base portion;

a second gripping plate secured adjacent a second side of said body plate of said base portion;

a first support plate secured adjacent said first gripping plate such that said first gripping plate is disposed between said body plate and said first support plate; and a second support plate secured adjacent said second gripping plate such that said second gripping plate is disposed between said body plate and said second support plate, wherein each of said first and second gripping plates is comprised of a semi-resilient material and includes a first portion extending outwardly beyond said body plate and said first and second support plates, respectively, to operably engage the rim flange, wherein each of said first and second support plates is comprised of a metal and includes a first portion extending outwardly beyond said body plate and said first and second gripping plates, respectively, to operably engage an inside surface of the rim, and wherein said top portion, said body plate and said pair of opposed sidewalls are integrally formed.

\* \* \* \* \*